(12) United States Patent
Varughese et al.

(10) Patent No.: US 11,381,426 B2
(45) Date of Patent: *Jul. 5, 2022

(54) SYSTEMS AND METHODS FOR IMPROVED DATA TRANSMISSION IN SHORT-REACH LINKS

(71) Applicant: Georgia Tech Research Corporation, Atlanta, GA (US)

(72) Inventors: Siddharth Jacob Varughese, Atlanta, GA (US); Joseph Justin Lavrencik, Atlanta, GA (US); Stephen E. Ralph, Atlanta, GA (US); Varghese Antony Thomas, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/209,111

(22) Filed: Mar. 22, 2021

(65) Prior Publication Data

US 2021/0211334 A1 Jul. 8, 2021

Related U.S. Application Data

(63) Continuation of application No. 16/127,177, filed on Sep. 10, 2018, now Pat. No. 10,958,486.

(60) Provisional application No. 62/729,357, filed on Sep. 10, 2018, provisional application No. 62/555,729, filed on Sep. 8, 2017.

(51) Int. Cl.
*H04L 25/03* (2006.01)
*H04L 1/20* (2006.01)
*H04B 10/69* (2013.01)
*H04B 10/58* (2013.01)
*H04L 7/00* (2006.01)

(52) U.S. Cl.
CPC ....... *H04L 25/03834* (2013.01); *H04B 10/58* (2013.01); *H04B 10/6971* (2013.01); *H04L 1/203* (2013.01); *H04L 7/00* (2013.01); *H04B 2210/254* (2013.01); *H04L 25/03343* (2013.01)

(58) Field of Classification Search
CPC ..... H04L 25/03834; H04L 1/203; H04L 7/00; H04L 25/03343; H04B 10/6971; H04B 10/58; H04B 2210/254
See application file for complete search history.

(56) References Cited

U.S. PATENT DOCUMENTS

| | | | |
|---|---|---|---|
| 6,175,600 B1 | 1/2001 | Guillemain et al. | |
| 7,715,669 B2 | 5/2010 | Cunningham et al. | |
| 8,705,602 B1 | 4/2014 | Ding et al. | |
| 2002/0114385 A1 | 8/2002 | Gu et al. | |
| 2003/0146370 A1* | 8/2003 | Ralph | G02B 6/4202 257/E31.115 |
| 2004/0008286 A1* | 1/2004 | Markman | H04L 25/061 348/E5.077 |
| 2005/0254553 A1 | 11/2005 | Yao et al. | |

(Continued)

*Primary Examiner* — Syed Haider
(74) *Attorney, Agent, or Firm* — Troutman Pepper Hamilton Sanders LLP; Ryan A. Schneider

(57) ABSTRACT

Systems and methods are provided for enabling lower-bandwidth hardware components to support higher data rates. In particular, aspects of the disclosed systems and methods use Raised Cosine pulse shaping in short-reach links to band limit the signal spectra and thereby enable existing, such lower-bandwidth components to support higher data rates.

24 Claims, 4 Drawing Sheets

(56) References Cited

U.S. PATENT DOCUMENTS

| | | | |
|---|---|---|---|
| 2006/0245765 A1 | 11/2006 | Elahmadi et al. | |
| 2009/0147895 A1 | 6/2009 | McKown | |
| 2010/0203854 A1 | 8/2010 | Yu et al. | |
| 2014/0363173 A1* | 12/2014 | Dave | H04B 10/516 398/208 |
| 2017/0012712 A1 | 1/2017 | Mitra et al. | |
| 2017/0302383 A1* | 10/2017 | Medra | H04J 11/004 |
| 2018/0091288 A1* | 3/2018 | Zamani | H04L 7/0278 |
| 2018/0219702 A1* | 8/2018 | Alic | H04L 25/03006 |
| 2019/0312717 A1 | 10/2019 | Wang et al. | |

\* cited by examiner $$H_p(f) = \begin{cases} T, & |f| \leq \frac{1-\beta}{2T} \\ \frac{T}{2}\left[1 + \cos\left(\frac{\pi T}{\beta}\left[|f| - \frac{1-\beta}{2T}\right]\right)\right], & \frac{1-\beta}{2T} < |f| \leq \frac{1+\beta}{2T} \\ 0, & otherwise \end{cases}$$

*FIG. 5*

SYSTEMS AND METHODS FOR IMPROVED DATA TRANSMISSION IN SHORT-REACH LINKS

CROSS-REFERENCE TO RELATED APPLICATIONS

This application is a continuation of U.S. patent application Ser. No. 16/127,177 filed 10 Sep. 2018 (now U.S. Pat. No. 10,958,486), which U.S. patent application Ser. No. 16/127,177 claims benefit under 35 USC § 119(e) of U.S. Provisional Patent Application Nos. 62/555,729 filed 8 Sep. 2017 and 62/729,357 filed 10 Sep. 2018, the entireties of which are incorporated herein by reference as if set forth herein in their entirety.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

SEQUENCE LISTING

Not Applicable

STATEMENT REGARDING PRIOR DISCLOSURES BY THE INVENTOR OR A JOINT INVENTOR

Not Applicable

BACKGROUND OF THE DISCLOSURE

1. Field of the Invention

The present invention relates to data transmission systems and methods, and more particularly techniques to cost-effectively increase data throughput in existing infrastructures of short-reach optical communication links using vertical-cavity surface-emitting lasers (VCSELs) and other direct-modulated lasers including distributed feedback (DFB) lasers

2. Description of Related Art

Short-reach optical communications links are needed to support data center needs and to manage client-side links. Direct modulation and detection using vertical-cavity surface-emitting laser (VCSEL) based multimode fiber (MMF) offer low cost and small form factor. Recently, 25 Gbps components are becoming available to support core data rates as standardized by the IEEE 802.3bm efforts. These core data rates support 50 Gbps and 100 Gbps data rates using multiple fibers. But a 400 GbE solution as envisioned by the IEEE P802.3bs Task Force will require 16 fibers in each direction. Thus, alternate solutions that require reduced fiber counts, including PAM-4 modulation with Reed-Solomon forward error correction (FEC), are needed to maintain the low cost and low power consumption of VCSEL MMF-based links for 400 Gbps and, eventually, 1 Tbps interconnects.

In particular, there is a need to develop 100 Gbps single VCSEL/fiber links while maintaining low cost and low power consumption. A preferred solution would retain the benefits of directly modulated VCSELs, direct detection, and MMF. Although component bandwidths have not scaled with line rates, transmitter-based pre-emphasis, receiver-based equalizers, and PAM-4 modulation have shown potential for extending the link capabilities. For example, solutions have demonstrated higher data rates of 71 Gbps NRZ, 70 Gbps PAM-4, and 56 Gbps PAM-8 using equalization. But in each example, the data rates have been constrained by link bandwidth.

To push VCSEL data rates to 100 Gbps with current techniques, the signaling requires at least 50 GHz of electrical bandwidth. But most commercially packaged VCSELs have a bandwidth in the low 20 GHz range. Accordingly, a need exists for techniques to cost-effectively increase data throughput in existing infrastructures of short-reach optical communication links using VCSELs and other direct-modulated lasers including distributed feedback (DFB) lasers.

BRIEF SUMMARY OF THE INVENTION

Briefly described, and according to an exemplary embodiment, aspects of the present disclosure generally relate to systems and methods for cost-effectively increasing data throughput in existing infrastructures. In an exemplary embodiment, methods of the disclosure include receiving, at a transmitter, a first electronic signal and equalizing, by the transmitter, and based at least in part on transmitter property foreknowledge, the first electronic signal. Methods of the disclosure can further include pulse shaping, by the transmitter, and based at least in part on the transmitter property foreknowledge, the first electronic signal and converting, by the transmitter, the equalized and pulse shaped first electronic signal into an optical signal. Methods can further sending, by the transmitter, and to a receiver, the optical signal, receiving, at the receiver, the optical signal, converting, at the receiver, the optical signal into a second electronic signal, filtering, by the receiver, the second electronic signal to minimize out-of-band noise and maximize signal-to-noise ratio for the second electronic signal, performing, by the receiver, timing recovery on the second electronic signal, equalizing, by the receiver, based at least in part on receiver property foreknowledge, the second electronic signal, and converting the second electronic signal into a plurality of bits for processing.

In another exemplary embodiment, the present invention comprises receiving, at a transmitter, a first electronic signal, converting the first electronic signal to data symbols, pulse shaping, based at least in part on anticipated transmitter property foreknowledge, the data symbols using pre-programmed values, equalizing, using pre-programmed filtering based at least in part on the anticipated transmitter property foreknowledge, the pulse shaped data, converting the equalized and pulse shaped data into an optical signal, transmitting the optical signal to a receiver, converting the optical signal into a second electronic signal, filtering the second electronic signal to minimize out-of-band noise and maximize signal-to-noise ratio for the second electronic signal, performing timing recovery on the second electronic signal, equalizing, using pre-programmed filtering based at least in part on anticipated receiver property foreknowledge, the second electronic signal, and slicing the equalized second electronic signal for calculation of a symbol error rate and to convert the second electronic signal into a plurality of bits for processing.

The transmitting the optical signal to the receiver can comprise transmitting the optical signal over a short-reach optical communication link to the receiver.

The pulse shaping can provide raised cosine pulses with roll-off factor between 0.05 and 0.3.

The anticipated transmitter property foreknowledge can comprise transmission response impairments relating to one or both of transmitter hardware bandwidth limitations and channel bandwidth limitations.

The transmitter can be preprogrammed with the transmitter property foreknowledge.

The pulse shaping can follow available frequency response, and the available frequency response depends from the equalizing the pulse shaped data.

The equalizing can comprise using a filter selected from the group consisting of an analog filter and a digital filter.

The pulse shaping can comprise using a filter selected from the group consisting of an analog filter and a digital filter.

The equalizing the second electronic signal can comprise equalizing at least one sample per symbol.

The equalizing can comprise using one or both of a feed forward equalizer with less than 12 forward taps and a digital feedback equalizer with less than five backwards taps.

The performing timing recovery on the second electronic signal can implement feedforward clock recovery.

The transmitter can comprise a directly modulated vertical-cavity surface-emitting laser.

The short-reach optical communication link can comprise a multimode fiber and/or a singlemode fiber.

The transmitter and the receiver can have a bandwidth of less than 50 GHz, and transmitting the optical signal via the short-reach optical communication link can comprise sending at a data rate of at least 100 Gbps via the short-reach optical communication link.

In another exemplary embodiment, the present invention comprises converting a first electronic signal to data symbols through symbol generation, raised cosine pulse shaping, based at least in part on anticipated transmitter property foreknowledge, the data symbols using pre-programmed values to provide raised cosine pulses with roll-off factor, between 0.05 and 0.3, equalizing, using pre-programmed filtering based at least in part on the anticipated transmitter property foreknowledge, the pulse shaped data, converting the equalized and raised cosine pulse shaped data into an optical signal, converting the optical signal into a second electronic signal, low pass filtering the second electronic signal to minimize out-of-band noise and maximize signal-to-noise ratio for the second electronic signal, performing timing recovery on the filtered second electronic signal, equalizing, using pre-programmed values based at least in part on anticipated receiver property foreknowledge, the time recovered second electronic signal, and slicing the equalized second electronic signal for calculation of a symbol error rate and to convert the second electronic signal into a plurality of bits for processing.

The method can further comprise sending the optical signal via a short-reach optical communication link after converting the equalized and raised cosine pulse shaped data into the optical signal and before the converting the optical signal into a second electronic signal.

In another exemplary embodiment, the present invention comprises receiving, at a transmitter, a first electronic signal, converting the first electronic signal to data symbols through symbol generation, raised cosine pulse shaping, based at least in part on anticipated transmitter property foreknowledge, the data symbols using pre-programmed values to provide raised cosine pulses with roll-off factor, between 0.05 and 0.3, equalizing, using pre-programmed filtering based at least in part on the anticipated transmitter property foreknowledge, the pulse shaped data, converting the equalized and raised cosine pulse shaped data into an optical signal, sending, to a receiver, the optical signal via a short-reach optical communication link, receiving, at the receiver, the optical signal, converting the optical signal into a second electronic signal, low pass filtering the second electronic signal to minimize out-of-band noise and maximize signal-to-noise ratio for the second electronic signal, performing timing recovery on the second electronic signal, equalizing, using pre-programmed values based at least in part on anticipated receiver property foreknowledge, the second electronic signal, and slicing the second electronic signal for calculation of a symbol error rate and to convert the second electronic signal into a plurality of bits for processing.

The transmitting the optical signal to the receiver can comprise transmitting the optical signal over a short-reach optical communication link to the receiver.

The pulse shaping can provide raised cosine pulses with roll-off factor between 0.05 and 0.3.

The anticipated transmitter property foreknowledge can comprise transmission response impairments relating to one or both of transmitter hardware bandwidth limitations and channel bandwidth limitations.

The transmitter can be preprogrammed with the transmitter property foreknowledge.

The pulse shaping can follow available frequency response, and the available frequency response depends from the equalizing the pulse shaped data.

The equalizing can comprise using a filter selected from the group consisting of an analog filter and a digital filter.

The pulse shaping can comprise using a filter selected from the group consisting of an analog filter and a digital filter.

The equalizing the second electronic signal can comprise equalizing at least one sample per symbol.

The equalizing can comprise using one or both of a feed forward equalizer with less than 12 forward taps and a digital feedback equalizer with less than five backwards taps.

The performing timing recovery on the second electronic signal can implement feedforward clock recovery.

The transmitter can comprise a directly modulated vertical-cavity surface-emitting laser.

The short-reach optical communication link can comprise a multimode fiber and/or a singlemode fiber.

The transmitter and the receiver can have a bandwidth of less than 50 GHz, and sending the optical signal via the short-reach optical communication link comprises sending at a data rate of at least 100 Gbps via the short-reach optical communication link.

In another exemplary embodiment, the present invention comprises, a system comprises a transmitter comprising, a symbol generator, a pulse shaper, a transmitter equalizer, an electronic-to-optical converter, a first processor, and a first memory in communication with the first processor, short-reach optical communication link, and a receiver comprising, an optical-to-electronic converter, a low pass filter, timing recoverer, receiver equalizer, a slicer, a second processor, and a second memory in communication with the second processor, wherein the transmitter and receiver are in communication via the short-reach optical communication link, wherein the first memory stores instructions that, when executed by the first processor, are configured to cause the transmitter to, receive a first electronic signal, convert the first electronic signal to data symbols with the symbol generator, raised cosine pulse shape with the pulse shaper, based at least in part on anticipated transmitter property foreknowledge, the data symbols using pre-programmed values to provide raised cosine pulses with roll-off factor, between 0.05 and 0.3, equalize, with the transmitter equalizer, using pre-programmed filtering based at least in part on the anticipated transmitter property foreknowledge, the pulse shaped data, convert with the electronic-to-optical converter the equalized and raised cosine pulse shaped data into an optical signal, and send, to the receiver, the optical signal via the short-reach optical communication link, and wherein the second memory stores instructions that, when executed by the second processor, are configured to cause the receiver to, receive the optical signal, convert with the optical-to-electronic converter the optical signal into a second electronic signal, filter with the low pass filter the second electronic signal to minimize out-of-band noise and maximize signal-to-noise ratio for the second electronic signal, perform timing recovery with the timing recoverer on the second electronic signal, equalize, with the receiver equalizer, using pre-programmed values based at least in part on anticipated receiver property foreknowledge, the second electronic signal, slice with the slicer the equalized second electronic signal for calculation of a symbol error rate and to convert the second electronic signal into a plurality of bits for processing.

The transmitter can comprise a directly modulated vertical-cavity surface-emitting laser.

The anticipated transmitter property foreknowledge can comprise transmission response impairments relating to one or both of transmitter hardware limitations and channel limitations. The raised cosine pulse shaping the first electronic signal can follow available frequency response.

The short-reach optical communication link can comprise a multimode and/or singlemode fiber.

The timing recovery on the second electronic signal can implement feedforward clock recovery.

Equalizing the second electronic signal can comprise equalizing at least one sample per symbol.

The transmitter and the receiver can have a bandwidth of less than 50 GHz, and sending, by the transmitter, the optical signal via the short-reach optical communication link can comprise sending, by the transmitter, the optical signal at a data rate of at least 100 Gbps via the short-reach optical communication link.

The anticipated transmitter property foreknowledge can comprise transmission response impairments relating to one or both of transmitter hardware bandwidth limitations and channel bandwidth limitations.

These and other aspects, features, and benefits of the claimed invention(s) will become apparent from the following detailed written description of the preferred embodiments and aspects taken in conjunction with the following drawings, although variations and modifications thereto may be effected without departing from the spirit and scope of the novel concepts of the disclosure.

BRIEF DESCRIPTION OF THE DRAWINGS

Implementations, features, and aspects of the disclosed technology are described in detail herein and are considered a part of the claimed disclosed technology. Other implementations, features, and aspects can be understood with reference to the following detailed description, accompanying drawings, and claims. Wherever possible, the same reference numbers are used throughout the drawings to refer to the same or like elements of an embodiment. Reference will now be made to the accompanying figures and flow diagrams, which are not necessarily drawn to scale.

FIG. 5 is an example frequency response of an RC filter of the disclosed technology, according to an example embodiment.

DETAILED DESCRIPTION OF THE INVENTION

Aspects of the disclosed systems and methods relate to use of Raised Cosine (RC) pulse shaping in short-reach links to band limit the signal spectra and thereby enable lower bandwidth components to support higher data rates. Additional aspects of the disclosed systems and methods include transmitter-based pre-emphasis and offline receiver-based equalization.

Some implementations of the disclosed technology will be described more fully hereinafter with reference to the accompanying drawings. This disclosed technology may, however, be embodied in many different forms and should not be construed as limited to the implementations set forth herein.

In the following description, numerous specific details are set forth. It is to be understood, however, that implementations of the disclosed technology may be practiced without these specific details. In other instances, well-known methods, structures and techniques have not been shown in detail in order not to obscure an understanding of this description. References to "one implementation," "an implementation," "example implementation," "various implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

Example implementations of the disclosed technology will now be described with reference to the accompanying figures.

Figure 1:
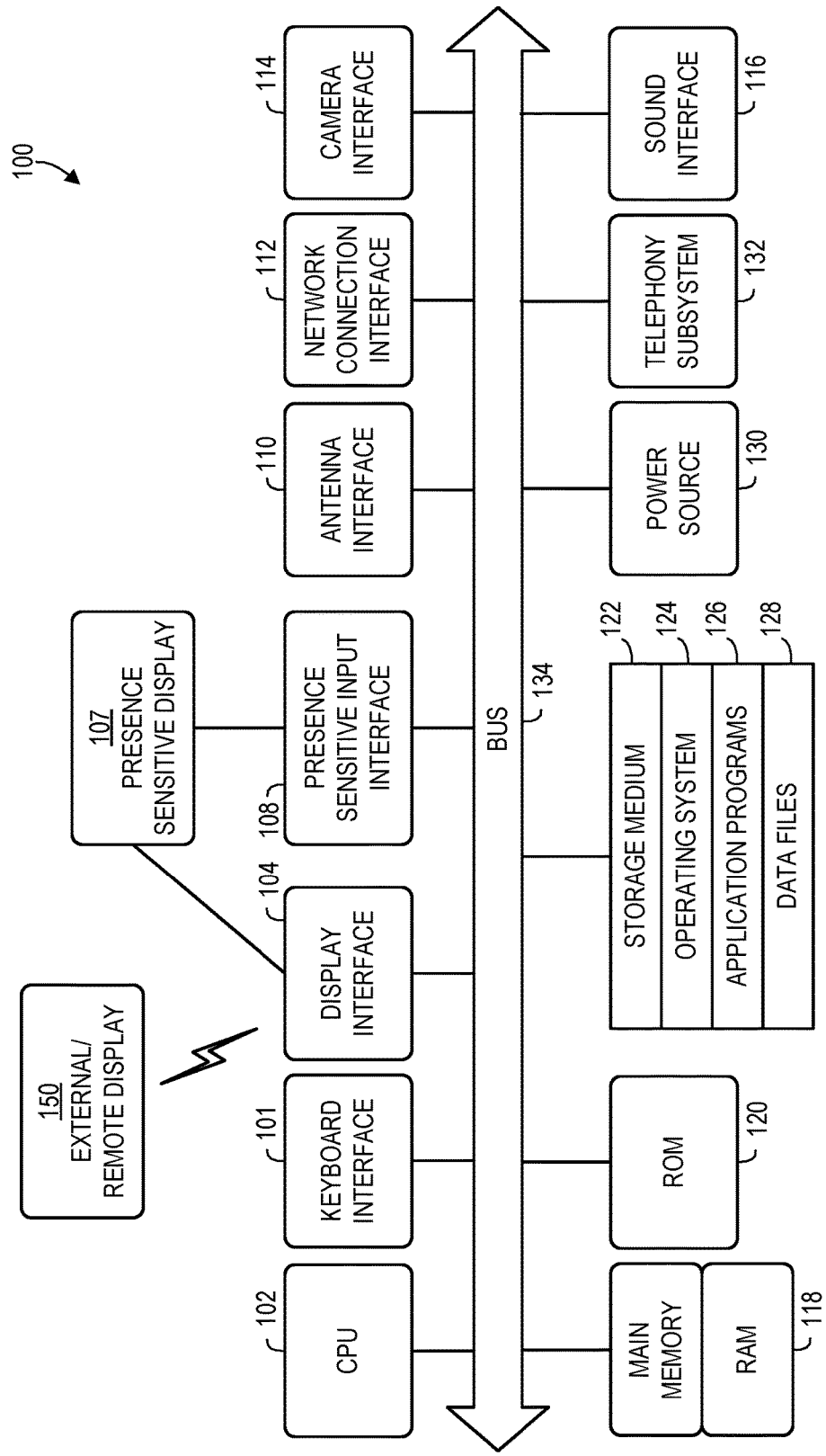
FIG. 1 is a block diagram of an illustrative computer system architecture 100, according to an example embodiment.

Aspects of the disclosed technology may be implementing using at least some of the components illustrated in the computing device architecture 100 of FIG. 1. As shown, the computing device architecture includes a central processing unit (CPU) 102, where computer instructions are processed; a display interface 104 that acts as a communication interface and provides functions for rendering video, graphics, images, and texts on the display. In certain example implementations of the disclosed technology, the display interface 104 may be directly connected to a local display, such as a touch-screen display associated with a mobile computing device. In another example implementation, the display interface 104 may be configured for providing data, images, and other information for an external/remote display that is not necessarily physically connected to the mobile computing device. For example, a desktop monitor may be utilized for mirroring graphics and other information that is presented on a mobile computing device. In certain example implementations, the display interface 104 may wirelessly communicate, for example, via a Wi-Fi channel or other available network connection interface 112 to the external/remote display.

In an example implementation, the network connection interface 112 may be configured as a communication interface and may provide functions for rendering video, graphics, images, text, other information, or any combination thereof on the display. In one example, a communication interface may include a serial port, a parallel port, a general purpose input and output (GPIO) port, a game port, a universal serial bus (USB), a micro-USB port, a high definition multimedia (HDMI) port, a video port, an audio port, a Bluetooth port, a near-field communication (NFC) port, another like communication interface, or any combination thereof. In one example, the display interface 104 may be operatively coupled to a local display, such as a touch-screen display associated with a mobile device. In another example, the display interface 104 may be configured to provide video, graphics, images, text, other information, or any combination thereof for an external/remote display that is not necessarily connected to the mobile computing device. In one example, a desktop monitor may be utilized for mirroring or extending graphical information that may be presented on a mobile device. In another example, the display interface 104 may wirelessly communicate, for example, via the network connection interface 112 such as a Wi-Fi transceiver to the external/remote display.

The computing device architecture 100 may include a keyboard interface 106 that provides a communication interface to a keyboard. In one example implementation, the computing device architecture 100 may include a presence-sensitive display interface 108 for connecting to a presence-sensitive display 107. According to certain example implementations of the disclosed technology, the presence-sensitive display interface 108 may provide a communication interface to various devices such as a pointing device, a touch screen, a depth camera, etc. which may or may not be associated with a display.

The computing device architecture 100 may be configured to use an input device via one or more of input/output interfaces (for example, the keyboard interface 106, the display interface 104, the presence sensitive display interface 108, network connection interface 112, camera interface 114, sound interface 116, etc.) to allow a user to capture information into the computing device architecture 100. The input device may include a mouse, a trackball, a directional pad, a track pad, a touch-verified track pad, a presence-sensitive track pad, a presence-sensitive display, a scroll wheel, a digital camera, a digital video camera, a web camera, a microphone, a sensor, a smartcard, and the like. Additionally, the input device may be integrated with the computing device architecture 100 or may be a separate device. For example, the input device may be an accelerometer, a magnetometer, a digital camera, a microphone, and an optical sensor.

Example implementations of the computing device architecture 100 may include an antenna interface 110 that provides a communication interface to an antenna; a network connection interface 112 that provides a communication interface to a network. As mentioned above, the display interface 104 may be in communication with the network connection interface 112, for example, to provide information for display on a remote display that is not directly connected or attached to the system. In certain implementations, a camera interface 114 is provided that acts as a communication interface and provides functions for capturing digital images from a camera. In certain implementations, a sound interface 116 is provided as a communication interface for converting sound into electrical signals using a microphone and for converting electrical signals into sound using a speaker. According to example implementations, a random access memory (RAM) 118 is provided, where computer instructions and data may be stored in a volatile memory device for processing by the CPU 102.

According to an example implementation, the computing device architecture 100 includes a read-only memory (ROM) 120 where invariant low-level system code or data for basic system functions such as basic input and output (I/O), startup, or reception of keystrokes from a keyboard are stored in a non-volatile memory device. According to an example implementation, the computing device architecture 100 includes a storage medium 122 or other suitable type of memory (e.g. such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives), where the files include an operating system 124, application programs 126 (including, for example, a web browser application, a widget or gadget engine, and or other applications, as necessary) and data files 128 are stored. According to an example implementation, the computing device architecture 100 includes a power source 130 that provides an appropriate alternating current (AC) or direct current (DC) to power components.

According to an example implementation, the computing device architecture 100 includes and a telephony subsystem 132 that allows the device 100 to transmit and receive sound over a telephone network. The constituent devices and the CPU 102 communicate with each other over a bus 134.

According to an example implementation, the CPU 102 has appropriate structure to be a computer processor. In one arrangement, the CPU 102 may include more than one processing unit. The RAM 118 interfaces with the computer bus 134 to provide quick RAM storage to the CPU 102 during the execution of software programs such as the operating system application programs, and device drivers.

More specifically, the CPU 102 loads computer-executable process steps from the storage medium 122 or other media into a field of the RAM 118 in order to execute software programs. Data may be stored in the RAM 118, where the data may be accessed by the computer CPU 102 during execution. In one example configuration, the device architecture 100 includes at least 98 MB of RAM, and 256 MB of flash memory.

The storage medium 122 itself may include a number of physical drive units, such as a redundant array of independent disks (RAID), a floppy disk drive, a flash memory, a USB flash drive, an external hard disk drive, thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, an external mini-dual in-line memory module (DIMM) synchronous dynamic random access memory (SDRAM), or an external micro-DIMM SDRAM. Such computer readable storage media allow a computing device to access computer-executable process steps, application programs and the like, stored on removable and non-removable memory media, to off-load data from the device or to upload data onto the device. A computer program product, such as one utilizing a communication system may be tangibly embodied in storage medium 122, which may comprise a machine-readable storage medium.

According to one example implementation, the term computing device, as used herein, may be a CPU, or conceptualized as a CPU (for example, the CPU 102 of FIG. 1). In this example implementation, the computing device (CPU) may be coupled, connected, and/or in communication with one or more peripheral devices, such as display. In another example implementation, the term computing device, as used herein, may refer to a mobile computing device such as a smartphone, tablet computer, or smart watch. In this example embodiment, the computing device may output content to its local display and/or speaker(s). In another example implementation, the computing device may output content to an external display device (e.g., over Wi-Fi) such as a TV or an external computing system.

In example implementations, on the transmit side, the disclosed systems and methods use a waveform generator to create an electrical signal for transmission. For example, a Keysight M8196 (i.e., a 92 GSa/s Arbitrary Waveform Generator (AWG)) with 32 GHz of analog bandwidth could be used to create a 107 Gbps electrical PAM-4 signal. Further, the AWG can implement pre-emphasis of the signal to compensate for estimated channel response, which can be estimated using, for example, calibration software. As will be understood by one of skill in the art, "channel" at a particular wavelength can include all components from the electronic-to-optical converter until the optical-to-electronic converter. In some implementations, the disclosed systems and methods can implement pre-emphasis on the transmitted signal using up to 10 tap finite impulse response (FIR) filter, which can provide raised cosine pulses having, for example, rectangular shaping or roll-off factor between 0.05 and 0.3. In an exemplary embodiment, the systems and methods obtain bit error rates as a function of baud rate to determine appropriate pulse shape.

In some implementations, a certain amount of overhead (e.g., 0%-7% overhead) can be included to allow for low latency Reed-Solomon (RS) forward error correction (FEC). As will be understood by one of skill in the art, FEC choice needs to be practical for propagation time, and a target latency of <250 ns gives RS FECs (255,239), (528,514), (544,514), (800,771), (510,478), and (560,514) as suitable options, thereby requiring a raw bit error rate (BER) of $4.2 \times 10^{-5}$ to $7.6 \times 10^{-1}$ for acceptable output BER (e.g., output BER of $1 \times 10^{-12}$).

Advantageously, the 0.1 RC pulse shape according to the disclosed systems and methods has been shown to extend the baud rate capabilities of available links without significant performance degradation. Further, 54 GBaud RC signaling according to the disclosed systems and methods indicates minimal performance degradation from conventional 30 GBaud rectangular signaling, which, as will be appreciated by one of skill in the art, is advantageous as only a 53.5 GBaud signal is required for 100 Gbps operation, which achieves the FEC-limit.

Additionally, the AWG signal can be amplified using, for example, a 70 GHz linear SHF 827 amplifier, and this pre-distorted signal can be passed through a cable and other intermediaries (e.g., 40 GHz bias-tee and 40 GHz probe) to then drive the VCSEL, which can pass the optical signal through the fiber and, ultimately, to a receiver.

In further implementations, on the receiver side, the transmitted optical signals can be captured by commercially available implements and then converted to the digital domain. For example, the optical signals can be captured using receivers having 28 GHz of bandwidth. The receiver can consist of, for example, a top-illuminated InGaAs photodiode and a low-noise transimpedance amplifier (TIA). Once received, the optical signals can be converted to the digital domain using a scope such as a 63 GHz real time scope or a 70 G sampling scope. As will be understood, a sampling scope is used to record the received eyes without any receiver equalization and a real-time scope can record the waveform for offline equalization and demodulation The received signal can be passed through a low-pass filter for SNR maximization through removal or suppression of any out-of-band noise. After the signal is filtered and the timing is recovered, adaptive equalization can be employed to overcome the intersymbol interference (ISI) imposed by the link bandwidth. In particular, according to certain implementations, the disclosed systems and methods make use of a training sequence, and synchronization (i.e., identification of the start of the training sequence) within the output of the receive filter is achieved through a cross-correlation test between the transmitted training sequence and the received signal waveform. And since an equalization method according to the present disclosure only requires one sample per signal, the synchronized received signal can be downsampled to one sample per symbol. As will be appreciated, such treatment of the received RC pulse shaped signal is sufficient to reliably sample the received signal.

According to some implementations, once down sampled to one sample per symbol, adaptive filtering can be performed on the symbols. As will be appreciated, one design goal of the disclosed systems and methods is minimizing DSP complexity for the sake of both cost and latency. Accordingly, the disclosed systems and methods generally ensure that the total DSP latency is much lower than the propagation time of the signal, which is ~500 ns per 100 m. As will further be appreciated, current existing solutions rely on maximum likelihood sequence estimation (MLSE), where their computational complexity scales exponentially with the length of the symbol blocks that are estimated at one time, making their deployment difficult. The disclosed systems and methods, on the other hand, according to an exemplary embodiment, implement equalization using a feed forward equalizer (FFE) with less than 12 forward taps and a digital feedback equalizer (DFE) with less than five backwards taps, which are commercially available with minimal hardware complexity and provide an optimum tradeoff between implementation complexity and BER performance, as will be appreciated. Further, according to some implementations, the DFE filter coefficients can be adaptively determined using the Least-Mean Square algorithm One of skill in the art will recognize that the BER performance of long-haul links are typically noise-limited. Accordingly, traditional pulse-shaping filters are implemented by splitting root-raised cosine filters between the transmitter and the receiver such that the receiver component filters the out-of-band noise to maximize the link SNR. But in short-reach links, Inter-Symbol Interference (ISI) limits the BER performance owing to the bandlimited nature of the short-reach links. Consequently, splitting the pulse-shaping functionality between the transmitter and receiver, as is conventional in long-haul links, does not provide any significant performance benefits and therefore using raised cosine pulse shaping only at the transmitter would not be obvious to one of skill in the art. As will further be understood by one of skill in the art, long-haul links use pulse shaping to maximize the number of wavelengths that can be multiplexed in the available fiber bandwidth. But since short-reach links typically employ a single wavelength (or wavelengths that are spread far apart in a multiple-wavelength scenario), it is not obvious to use pulse shaping in short-reach. One of skill in the art will also recognize that using pulse shaping in short-reach links is not an obvious option because pulse shaping is sensitive to bandwidth limitations and timing jitter and therefore the benefits of pulse shaping may not always outweigh its penalties in bandlimited systems with simple timing recovery techniques. Finally, pulse-shaping filters in long haul links are implemented digitally using a Finite Impulse Response (FIR) structure and are typically associated with high implementation costs. This makes them expensive, energy inefficient and non-ideal for low-cost power-efficient short-reach links.

Figure 2:
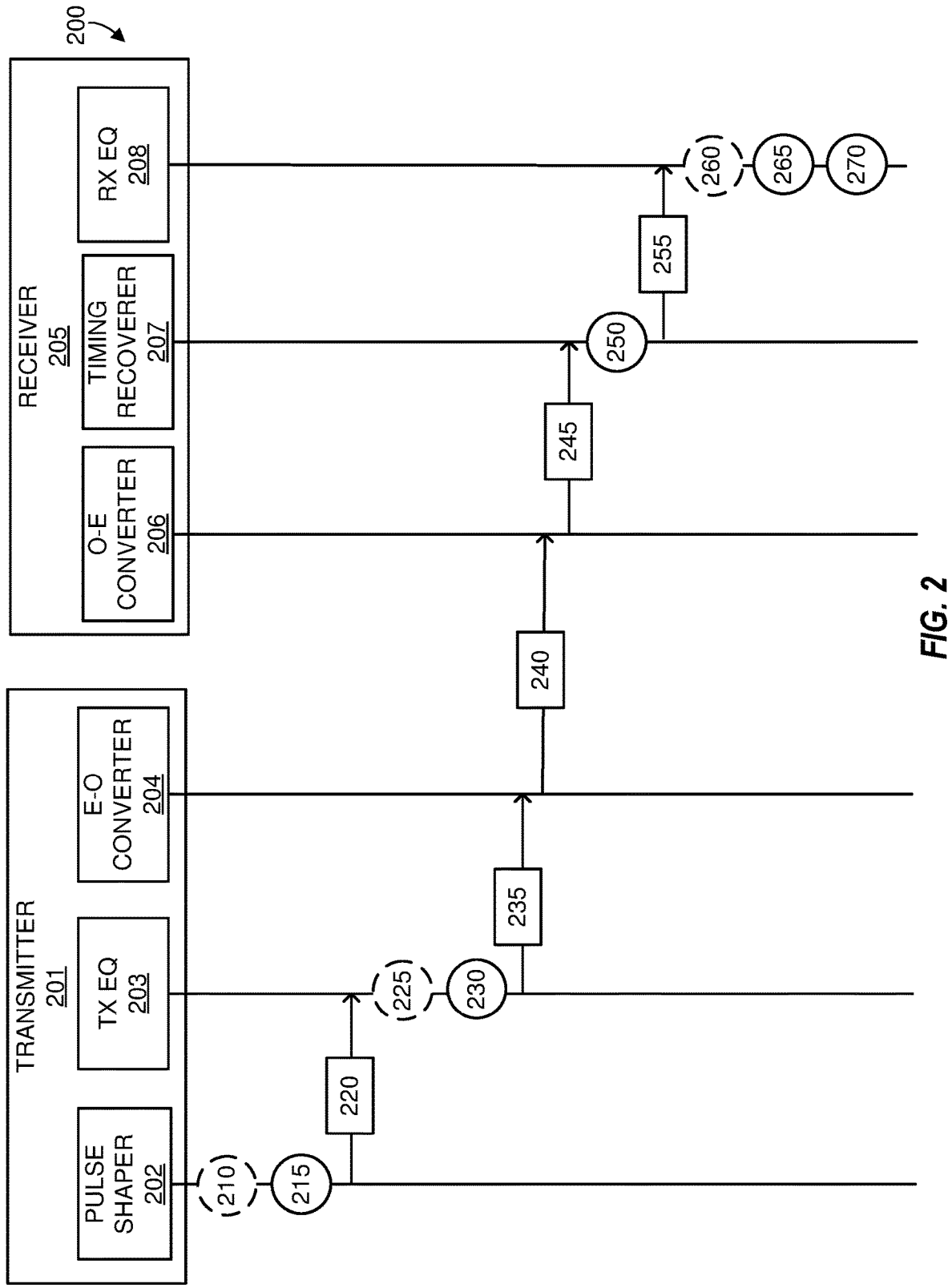
FIG. 2 is a diagram illustrating data flow and processes 200 carried out by components of the disclosed systems and methods, according to an example embodiment.
Figure 3:
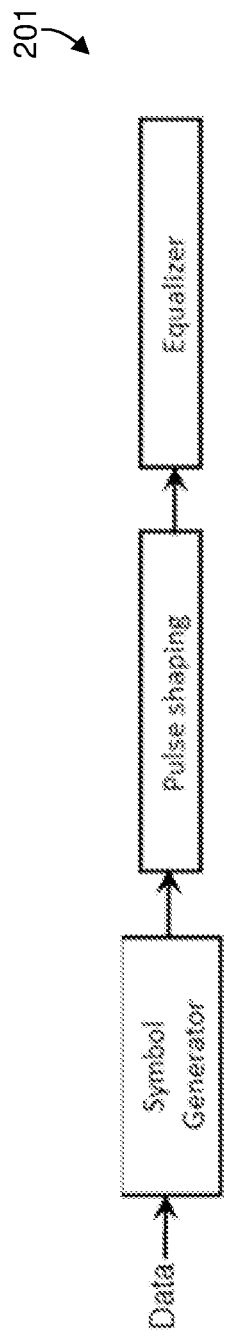
FIG. 3 is an overview of a transmitter 201 architecture, according to an example embodiment.
Figure 4:
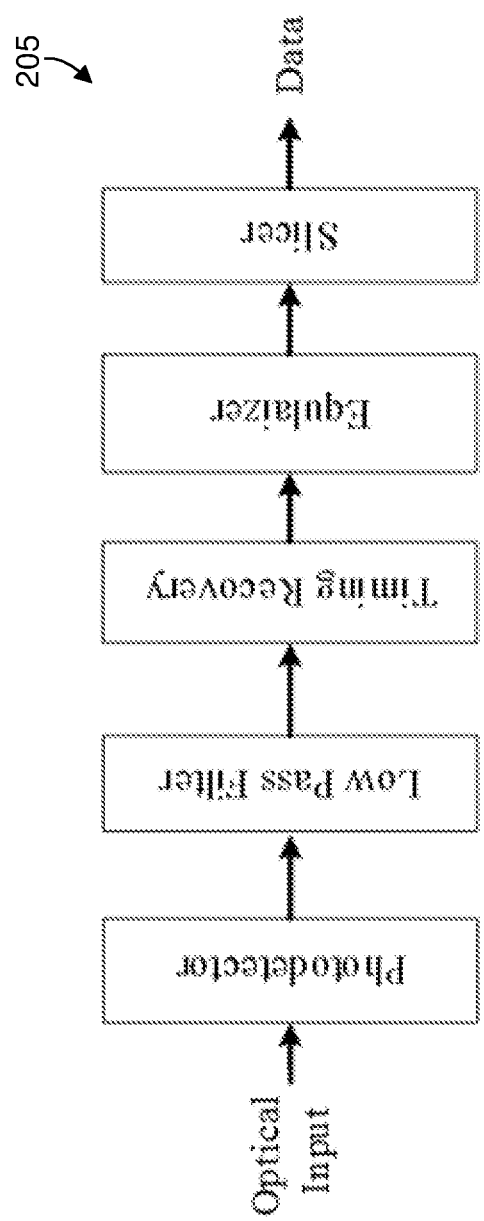
FIG. 4 is an alternate view of a receiver 205 architecture, according to an example embodiment.

FIG. 2 is a diagram illustrating data flow and processes 200 carried out by components of the disclosed systems and methods, according to an exemplary embodiment. In particular, as shown in FIG. 3, a system of the disclosed technology can include transmitter 201 and receiver 205 for use in short-reach optical communications links. Additional implementations of transmitter 201 and receiver 205 are shown in FIGS. 3 and 4. As shown in FIG. 2, transmitter 201 can include pulse shaper 202, transmitter equalizer 203, and electronic-to-optical (E-O) converter 204. As further shown, receiver 205 can include optical-to-electronic (O-E) converter 206, timing recoverer 207, and receiver equalizer 208. As will be understood, while shown as individual modules, the modules are shown as convenience to the reader to better understand the disclosed technology and are not intended to be limiting. One of skill in the art will understand that the disclosed embodiments relate to tangible and non-transitory computer readable media that include program instructions or program code that, when executed by one or more processors, perform one or more computer-implemented operations. The program instructions or program code may include specially designed and constructed instructions or code, and/or instructions and code well-known and available to those having ordinary skill in the computer software arts. For example, the disclosed embodiments may execute high level and/or low-level software instructions, such as machine code (e.g., such as that produced by a compiler) and/or high-level code that can be executed by a processor using an interpreter.

As discussed, pulse shaper 202, transmitter equalizer 203, and receiver equalizer 206 can use filtering to optimize link performance. Depending on the implementation, systems and methods of the present disclosure can use one of pulse shaper 202, transmitter 203, and receiver 206, each of pulse shaper 202, transmitter 203, and receiver 206, or any combination thereof.

According to embodiments of the disclosed technology, pulse shaper 202 can shape pulses that ensure that the signal to be transmitted optimally occupies the bandwidth available on the link. Transmitter equalizer 203 can, at a minimum, fix or mitigate anticipated transmission response impairments in an effort to ensure that the channel behaves optimally. As will be understood by one of skill in the art, transmission response impairments can include limitations of the hardware itself (i.e., E-O converter 204), and can also include limitations of the channel, which includes the fiber linking transmitter 201 and receiver 205. As will be understood by one of skill in the art, use of transmission equalizer 203 influences how pulse shaper 202 will shape pulses as use of transmission equalizer 203 necessarily affects bandwidth available on the link. Put differently, pulse shaping follows available frequency response, and available frequency response depends from equalization (i.e., filtering done by transmission equalizer 203) or lack thereof.

Receiver equalizer 208 can, at a minimum, fix anticipated receiver response (i.e., limitations of the hardware (e.g., O-E converter 206)) but as with transmission equalizer 203, receiver equalizer 208 can also mitigate impairments to the channel, including the fiber link. In certain embodiments, receiver equalizer 208 can adaptively mitigate unknown or unanticipated impairments to the hardware and channel as desired.

As shown in FIG. 2, pulse shaper 202 can optionally dynamically receive 210 transmitter properties, which can include bandwidth and frequency response, as well as link and receiver information. Though as shown, such information does not have to be dynamically received. Instead, pulse shaper 202 can have foreknowledge of (i.e., be preprogrammed with) information for use in producing 215 intelligently designed temporal raised cosine pulses based on the components of the system. As shown in FIG. 2, in an exemplary embodiment, after producing 215 the raised cosine pulse, pulse shaper 202 can send 220 the pulse to transmission equalizer 203 for additional filtering.

As with pulse shaper 202, and as shown in FIG. 2, transmission equalizer 203 can optionally dynamically receive 225 transmitter properties (e.g., bandwidth and frequency response), as well as link and receiver information, all of which can be used to filter 230 the signal to mitigate anticipated transmission response impairments. Transmission equalizer 203 can send 235 the signal to E-O converter 204, which can convert the electronic signal into an optical signal and output 240 the signal to receiver 205. O-E converter 206 can receive the optical signal and convert it to an electronic signal, which it can then send 245 to timing recoverer 207. As discussed, timing recovery can be performed 250 using, for example, an advanced timing recovery scheme. In some implementations, timing recoverer 207 can implement the Oeder-Meyer scheme (i.e., a scheme that compensates for fractional baud rate errors that arise from imperfect clocks in the digital-to-analog and analog-to-digital converters). As discussed previously, and though not shown, prior to performing timing recovery, receiver 205 can pass the received signal through a low-pass filter for SNR maximization to remove or suppress any out-of-band noise.

As shown in FIG. 2, after performing timing recovery, timing recoverer 207 can pass 255 the signal to receiver equalizer 208 which can, at a minimum, fix anticipated receiver response (i.e., limitations of O-E converter 206). Additionally, receiver equalizer 208 can mitigate impairments to the channel, including the fiber link. In certain embodiments, receiver equalizer 208 can adaptively mitigate 265 unknown or unanticipated impairments to the hardware and channel as desired. As with transmitter equalizer 203, receiver equalizer 208 can optionally dynamically receive 260 receiver properties (e.g., bandwidth and frequency response), as well as link and transmitter information, all of which can be used to filter 265 the signal to mitigate anticipated receiver response impairments. Further, in an exemplary embodiment, receiver equalizer 208 can adaptively mitigate unknown or unanticipated impairments to the hardware and channel. Such adaptive filtering can occur once (i.e., the first time receiver 205 receives a signal from transmitter 201) or dynamically (i.e., each time receiver 205 receives a signal from transmitter 201). Finally, as shown in FIG. 2, receiver equalizer 208 can send the equalized output through a slicer (as shown in FIG. 5) for calculation of symbol error rate and for converting the signal to bits for further processing.

It should be understood that while FIG. 2 shows pulse shaper 202 passing pulses to transmission equalizer 203, embodiments of the disclosed technology can include pulse shaping and/or transmission equalization, and pulse shaping can occur before transmission equalization, as shown, or vice versa. In general, embodiments of the disclosed technology are described above with reference to block and flow diagrams of systems and/or methods according to example embodiments of the disclosed technology. Some blocks of the block diagrams and flow diagrams may not necessarily need to be performed in the order presented, or may not necessarily need to be performed at all, according to an exemplary embodiment of the disclosed technology.

As noted, FIGS. 3 and 4 provide additional overviews of transmitter 201 architecture and receiver 205 architecture, respectively. As shown in FIG. 3, in addition to the components shown in FIG. 2, transmitter 201 can include a symbol generator that receives data and converts the data to symbols prior to passing the information to pulse shaper 202. As shown in FIG. 4, in addition to the components shown in FIG. 2, receiver 205 can include a low pass filter and slicer, as discussed previously.

FIG. 5 is an example frequency response $H_p(f)$ 500 of an RC filter employed by, for example, pulse shaper 202. As shown in FIG. 5, T is the symbol period, while $\beta$ is the roll-off factor.

While certain embodiments of the disclosed technology have been described in connection with what is presently considered to be the most practical embodiments, it is to be understood that the disclosed technology is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the disclosed technology, including the best mode, and also to enable any person skilled in the art to practice certain embodiments of the disclosed technology, including making and using any devices or systems and performing any incorporated methods. The patentable scope of certain embodiments of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method comprising:
receiving, at a transmitter, a first electronic signal;
converting the first electronic signal to data symbols;
pulse shaping, based at least in part on anticipated transmitter property foreknowledge,
the data symbols utilizing pre-programmed values;
equalizing, utilizing pre-programmed filtering based at least in part on the anticipated transmitter property foreknowledge, the pulse shaped data;
converting the equalized and pulse shaped data into an optical signal;
transmitting the optical signal to a receiver;
converting the optical signal into a second electronic signal;
filtering the second electronic signal to minimize out-of-band noise and maximize signal-to-noise ratio for the second electronic signal;
performing timing recovery on the second electronic signal; equalizing, utilizing pre-programmed filtering based at least in part on anticipated receiver property foreknowledge, the second electronic signal; and
slicing the equalized second electronic signal for calculation of a symbol error rate and to convert the second electronic signal into a plurality of bits for processing.

2. The method of claim 1, wherein the transmitting the optical signal to the receiver comprises transmitting the optical signal over a short-reach optical communication link to the receiver.

3. The method of claim 1, wherein the pulse shaping provides raised cosine pulses with roll-off factor between 0.05 and 0.3.

4. The method of claim 1, wherein the anticipated transmitter property foreknowledge comprises transmission response impairments relating to one or both of transmitter hardware bandwidth limitations and channel bandwidth limitations.

5. The method of claim 1, wherein the transmitter is preprogrammed with the transmitter property foreknowledge.

6. The method of claim 1, wherein the pulse shaping follows available frequency response, and the available frequency response depends from the equalizing the pulse shaped data.

7. The method of claim 1, wherein the equalizing comprises utilizing a filter selected from a group consisting of an analog filter and a digital filter.

8. The method of claim 1, wherein the pulse shaping comprises utilizing a filter selected from a group consisting of an analog filter and a digital filter.

9. The method of claim 1, wherein the equalizing the second electronic signal comprises equalizing at least one sample per symbol.

10. The method of claim 1, wherein the equalizing comprises utilizing one or both of a feed forward equalizer with less than 12 forward taps and a digital feedback equalizer with less than five backwards taps.

11. The method of claim 1, wherein the performing timing recovery on the second electronic signal implements feedforward clock recovery.

12. The method of claim 1, wherein the transmitter comprises a directly modulated vertical-cavity surface-emitting laser.

13. The method of claim 2, wherein the short-reach optical communication link comprises a multimode fiber.

14. The method of claim 2, wherein the short-reach optical communication link comprises a singlemode fiber.

15. A method comprising:
converting a first electronic signal to data symbols through symbol generation;
raised cosine pulse shaping, based at least in part on anticipated transmitter property foreknowledge, the data symbols utilizing pre-programmed values to provide raised cosine pulses with roll-off factor, between 0.05 and 0.3;
equalizing, utilizing pre-programmed filtering based at least in part on the anticipated transmitter property foreknowledge, the pulse shaped data;
converting the equalized and raised cosine pulse shaped data into an optical signal;
converting the optical signal into a second electronic signal;
low pass filtering the second electronic signal to minimize out-of-band noise and maximize signal-to-noise ratio for the second electronic signal;
performing timing recovery on the filtered second electronic signal;
equalizing, utilizing pre-programmed values based at least in part on anticipated receiver property foreknowledge, the time recovered second electronic signal; and
slicing the equalized second electronic signal for calculation of a symbol error rate and to convert the second electronic signal into a plurality of bits for processing.

16. The method of claim 15 further comprising sending the optical signal via a short-reach optical communication link after converting the equalized and raised cosine pulse shaped data into the optical signal and before the converting the optical signal into the second electronic signal.

17. A method comprising:
receiving, at a transmitter, a first electronic signal;
converting the first electronic signal to data symbols through symbol generation;
raised cosine pulse shaping, based at least in part on anticipated transmitter property foreknowledge, the data symbols utilizing pre-programmed values to provide raised cosine pulses with roll-off factor, between 0.05 and 0.3;
equalizing, utilizing pre-programmed filtering based at least in part on the anticipated transmitter property foreknowledge, the pulse shaped data;
converting the equalized and raised cosine pulse shaped data into an optical signal;
sending, to a receiver, the optical signal via a short-reach optical communication link;
receiving, at the receiver, the optical signal;
converting the optical signal into a second electronic signal;
low pass filtering the second electronic signal to minimize out-of-band noise and maximize signal-to-noise ratio for the second electronic signal;
performing timing recovery on the second electronic signal;
equalizing, utilizing pre-programmed values based at least in part on anticipated receiver property foreknowledge, the second electronic signal; and
slicing the second electronic signal for calculation of a symbol error rate and to convert the second electronic signal into a plurality of bits for processing.

18. The method of claim 17, wherein the transmitter comprises a directly modulated vertical-cavity surface-emitting laser.

19. The method of claim 17, wherein the anticipated transmitter property foreknowledge comprises transmission response impairments relating to one or both of transmitter hardware bandwidth limitations and channel bandwidth limitations.

20. The method of claim 17, wherein the raised cosine pulse shaping the first electronic signal follows available frequency response.

21. The method of claim 17, wherein the short-reach optical communication link is selected from a group consisting of a multimode fiber and a singlemode fiber.

22. The method of claim 17, wherein the timing recovery on the second electronic signal implements feedforward clock recovery.

23. The method of claim 17, wherein the equalizing the second electronic signal comprises equalizing at least one sample per symbol.

24. The method of claim 17, wherein the transmitter and the receiver have a bandwidth of less than 50 GHz; and
wherein sending the optical signal via the short-reach optical communication link comprises sending at a data rate of at least 100 Gbps via the short-reach optical communication link.

* * * * *